United States Patent [19]

Van Sistine

[11] Patent Number: 5,525,887
[45] Date of Patent: Jun. 11, 1996

[54] SWITCHED RELUCTANCE MOTOR PROVIDING ROTOR POSITION DETECTION AT LOW SPEEDS WITHOUT A SEPARATE ROTOR SHAFT POSITION SENSOR

[75] Inventor: Thomas G. Van Sistine, Menomonee Falls, Wis.

[73] Assignee: A. O. Smith Corporation, Milwaukee, Wis.

[21] Appl. No.: 404,385

[22] Filed: Mar. 14, 1995

[51] Int. Cl.⁶ .................................................. H02P 7/00
[52] U.S. Cl. ........................................ 318/701; 318/254
[58] Field of Search ................................... 318/701, 254, 318/138, 439, 696, 685

[56] References Cited

U.S. PATENT DOCUMENTS

| | | | |
|---|---|---|---|
| 3,909,688 | 9/1975 | Blaschke et al. | 318/227 |
| 4,253,053 | 2/1981 | Ray et al. | 318/701 |
| 4,520,302 | 5/1985 | Hill et al. | 318/696 |
| 4,670,698 | 6/1987 | Fulton et al. | 318/802 |
| 4,731,570 | 3/1988 | Lee | 318/696 |
| 4,739,240 | 4/1988 | MacMinn et al. | 318/696 |
| 4,746,850 | 5/1988 | Abbondanti | 318/778 |
| 4,772,839 | 9/1988 | MacMinn et al. | 318/696 |
| 4,868,478 | 9/1989 | Hedlund et al. | 318/696 |
| 4,876,491 | 10/1989 | Squires et al. | 318/138 |
| 4,992,710 | 2/1991 | Cassat | 318/254 |
| 5,001,405 | 3/1991 | Cassat | 318/254 |
| 5,015,939 | 5/1991 | Konecny | 318/701 |
| 5,017,845 | 5/1991 | Carobolante et al. | 318/138 |
| 5,028,852 | 7/1991 | Dunfield | 318/254 |
| 5,043,643 | 8/1991 | Hedlund et al. | 318/254 |
| 5,051,680 | 9/1991 | Belanger | 318/701 |
| 5,117,165 | 5/1992 | Cassat et al. | 318/254 |
| 5,373,206 | 12/1994 | Lim | 318/138 X |
| 5,440,218 | 8/1995 | Oldenkamp | 318/701 |

Primary Examiner—Jonathan Wysocki
Attorney, Agent, or Firm—James Earl Lowe, Jr.; Thomas A. Miller

[57] ABSTRACT

A switched reluctance motor includes a rotor mounted for rotation about a rotor shaft axis and a stator surrounding the rotor and having at least three electrically independent stator phases. The motor includes an electronic circuit for selectively energizing the phases in succession with a run current to generate a torque on the rotor and thereby rotate the rotor. The circuit includes switch operating means for selectively operating switches connecting an energy source to the phases. The circuit also includes current sensing means for sensing the amount of current in each of the phases, and timing means for determining the amount of time for the current in each phase to reach a predetermined current level threshold. The circuit also includes pulse means for periodically selectively operating the switch operating means for a limited time to energize the unenergized phases with a seek current without substantially generating torque on the rotor, and comparing means for comparing the amount of time that current in each of the unenergized phases took to reach the predetermined current level threshold. The circuit also includes run means connected to the comparing means and the switch operating means for switching on a selected one of the switches to rotate the rotor.

15 Claims, 2 Drawing Sheets

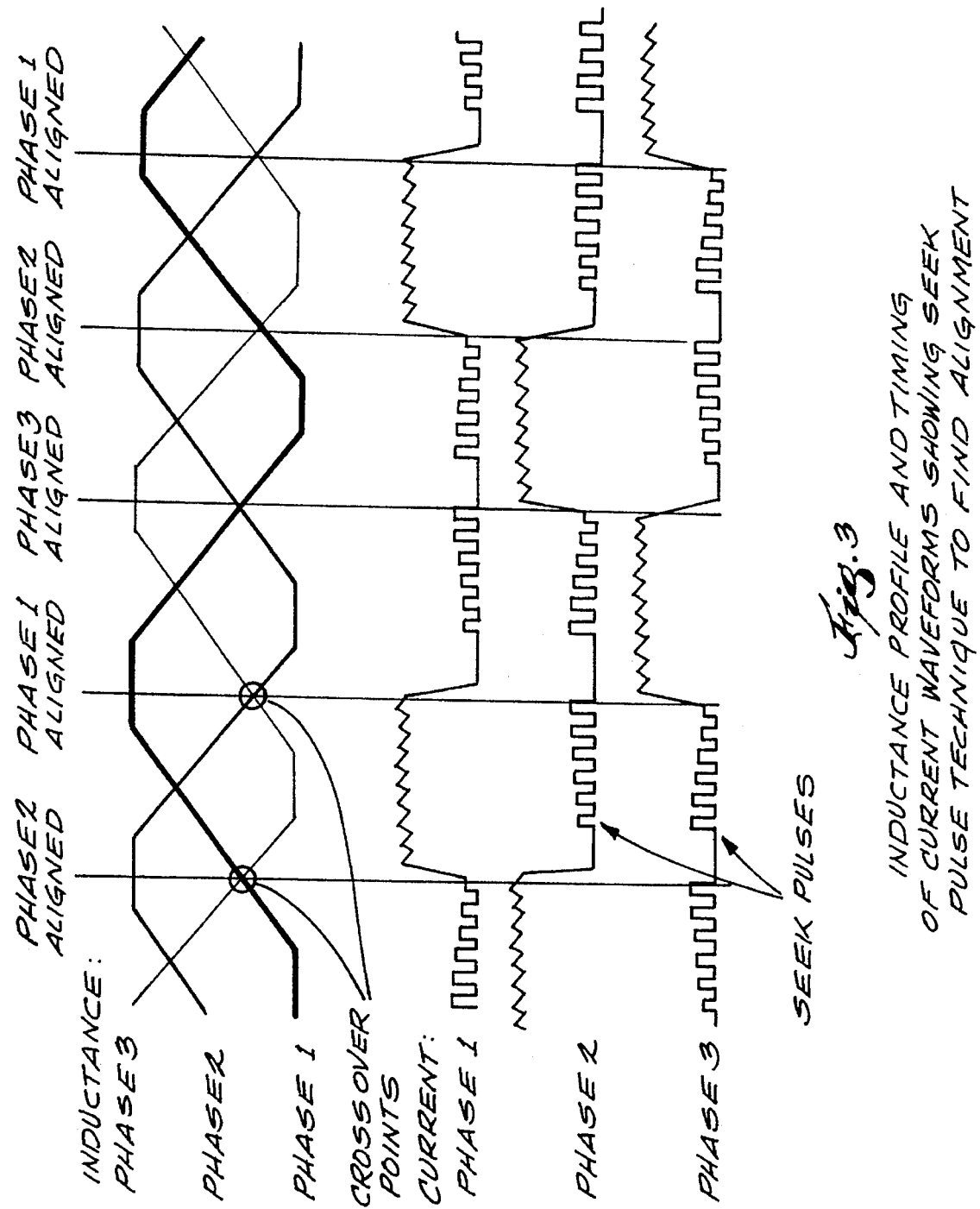

SWITCHED RELUCTANCE MOTOR PROVIDING ROTOR POSITION DETECTION AT LOW SPEEDS WITHOUT A SEPARATE ROTOR SHAFT POSITION SENSOR

BACKGROUND OF THE INVENTION

The invention relates to switched reluctance ("SR") motors and, more particularly, to an apparatus for determining which phase of an SR motor to commutate at a given moment.

SR motors have multiple poles on both the stator and the rotor. There are windings or coils on the stator poles and each pair of windings on diametrically opposite stator poles is connected in series to form an electrically independent phase of the SR motor. There are no windings or magnets on the rotor. However, the rotor is made of a magnetically permeable material such as, for example, a ferrous alloy.

In order to energize or commutate an SR motor, it is necessary to first determine the position of the rotor with respect to the stator. The position of the rotor with respect to the stator establishes which phase of the stator should be energized at a given moment. If the position of the rotor is not correctly determined, commutation of one of the stator phases may result in inefficient motor operation or braking of the rotor. However, many conventional sensors for determining the rotor position at a given moment are bulky, unreliable and expensive.

SUMMARY OF THE INVENTION

The rise time of current in a particular stator phase of an SR motor varies with the inductance of the phase. The inductance of a phase of an SR motor is a function of the position of the rotor poles with respect to the stator poles comprising the phase. Therefore, the position of the rotor (and the rotor poles) can be detected by measuring the rise times of the current in each of the respective stator phases.

The rise time of current in a particular phase varies with the inductance of the phase in accordance with the equation: $V=L (dI/dT)$ where V is the voltage across the phase, L is the inductance of the phase, and $dI/dT$ is the change in current with respect to time. In accordance with the present invention, the unenergized phases of the motor are supplied with a seek current and the rise times of the seek current in the unenergized phases are compared to determine when the next unenergized phase should be energized.

Accordingly, the invention provides an electric circuit for energizing a switched reluctance motor. The motor has a rotor mounted for rotation about an axis and the rotor includes a plurality of rotor poles. A stator surrounds the rotor and includes at least three stator pole pairs and at least three stator coils wound onto the stator pole pairs to form at least three electrically independent stator phases.

The circuit of the invention employs a microprocessor and support circuitry in combination with a field programmable gate array. The use of a gate array in combination with a microprocessor reduces the number of components necessary to practice the invention and reduces the space requirements of the circuit.

In general terms, the circuit includes switch operating means for selectively operating switches connecting an energy source to the phases. The circuit also includes current sensing means for sensing the amount of current in each of the phases, and timing means for determining the amount of time for the current in each phase to reach a predetermined current level threshold. The circuit also includes pulse means for periodically selectively operating the switch operating means for a limited time to energize the unenergized phases with a seek current without substantially generating torque on the rotor, and comparing means for comparing the amount of time that current in each of the unenergized phases took to reach the predetermined current level threshold. The circuit also includes run means connected to the comparing means and the switch operating means for switching on a selected one of the switches to rotate the rotor.

A principal advantage of the invention is the use of a microprocessor and field programmable gate array to detect rotor position without the use of a discrete rotor position sensor.

Another advantage of the invention is the provision of a simple circuit for driving a switched reluctance motor at low speeds. Unlike more complex prior art approaches, pulse signals are not individually analyzed to determine inductance and expected rotor position. Such techniques have required frequent seek pulses on the order of 10 Khz. With the invention, only 1 khz pulses can be used.

Other features and advantages of the invention will become apparent to those skilled in the art upon review of the following detailed description, claims and drawings.

DESCRIPTION OF THE DRAWINGS

FIG. 3 is a graphic chart illustrating the phase inductances relative to the rotor pole positions as well as the energizing current and the seek pulses provided to the phases at those positions.

Figure 1:
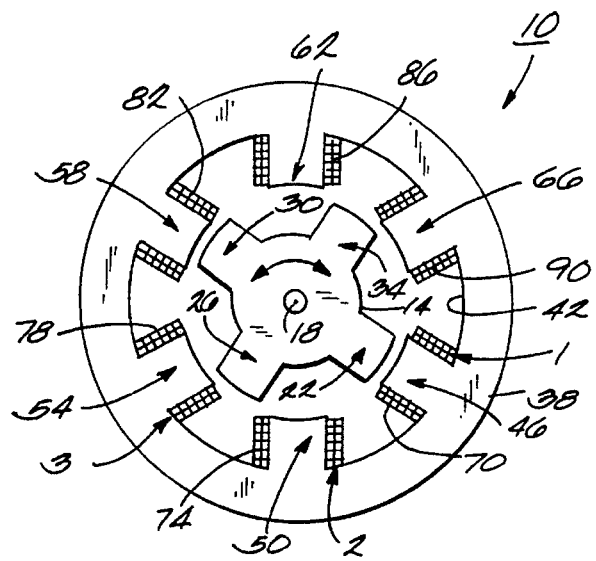
FIG. 1 is a schematic view of a switched reluctance motor showing, in cross-section, the stator and the rotor of the switched reluctance motor.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENTS

Shown in FIG. 1 of the drawings is a schematic view of a switched reluctance motor 10. The switched reluctance motor 10 includes a rotor 14 mounted for rotation about an axis 18. The rotor 14 includes four rotor poles 22, 26, 30, and 34. The rotor poles 22, 26, 30, and 34 are evenly spaced about the axis 18 and extend radially outward from the rotor 14 relative to the axis 18.

The motor 10 also includes a stator 38 surrounding the rotor 14. The stator 38 has an inner surface 42 and six stator poles 46, 50, 54, 58, 62 and 66, extending from the inner surface 42 inwardly toward the rotor axis 18. The stator poles 46, 50, 54, 58, 62 and 66, are evenly spaced about the inner surface 42 of the stator 38. Because the motor 10 includes six stator poles and four rotor poles, the switched reluctance motor 10 shown in FIG. 1 is referred to as 6/4 (six stator pole to four rotor pole ratio) switched reluctance motor. While this description will refer to the operation of the invention in terms of a 6/4 SR motor, it should be understood that any switched reluctance motor having any number of stator poles and rotor poles can be controlled with the circuit disclosed herein.

The SR motor 10 also includes windings or coils 70, 74, 78, 82, 86 and 90, on the stator poles 46, 50, 54, 58, 62 and 66, respectively. The windings are made of a conductor of a precise gauge which is wound around the stator pole a precise number of times or turns. The gauge of the wire and the number of turns vary depending upon the application. While the description applies equally to any SR motor using any gauge wire or having any number of turns, in the embodiment shown in the drawings, each stator pole has 98 turns and the motor is referred to as a 98 turn 6/4 SR motor.

The windings 70, 74, 78, 82, 86 and 90, on diametrically opposite stator poles 46, 50, 54, 58, 62 and 66, are connected in series to form three electrically independent phases 1, 2, and 3 of the SR motor 10. As shown in FIG. 1, the windings 70 and 82 on stator poles 46 and 58, respectively, form pole pairs which together form Phase 1, the windings 74 and 86 on stator poles 50 and 62, respectively, form pole pairs which together form Phase 2, and the windings 78 and 90 on stator poles 54 and 66, respectively, form pole pairs which together form Phase 3. Because the rotor 14 is made of ferromagnetic material, energizing a particular phase of the motor 10 results in the formation of a magnetic attraction between the windings on the stator poles comprising the energized phase and the rotor poles closest to the stator poles of the energized phase. By energizing the phases in a particular manner, the rotational direction and speed of the rotor 14 can be precisely controlled.

Figure 2:
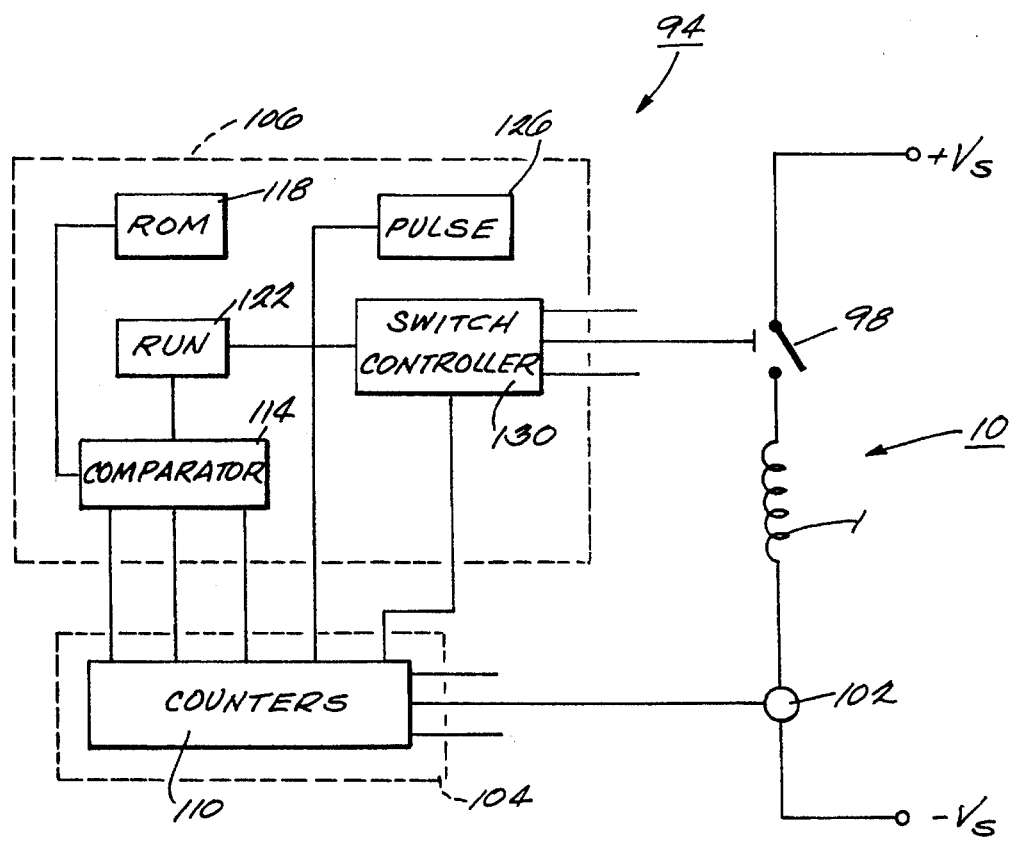
FIG. 2 is a schematic diagram of the electronic circuit for energizing the switched reluctance motor at low speeds, with a simplified illustration of the phase leg of the circuit.

FIG. 2 illustrates a simplified schematic diagram of an electronic circuit 94 for energizing the SR motor 10 at low rotor speeds. More particularly, the circuit 94 includes a plurality of phase switches 98 connected between said phases and a supply voltage for selectively electrically connecting the supply voltage to each phase. In other words, the circuit 94 connected to the motor 10, which is shown schematically as phase winding 1 (only one of the three is shown), is connected between a positive supply voltage (+Vs) and a negative supply voltage (−Vs) via a switch or relay 98. This portion of the circuit 94 is duplicated as many times as there are phases on the particular SR motor 10. For the SR motor 10 shown in FIG. 1 of the drawings, there are three phases and accordingly, this portion of the circuit 94 is repeated three times, i.e., there are three phase windings connected between the positive and negative supply voltages via three switches 98. Only one of these circuit portions will be shown and described in detail.

The circuit 94 for controlling the motor 10 includes current sensing means connected to the phase winding 1. While any conventional current sensor is appropriate, the sensing means of the embodiment shown in FIG. 2 is a current sensor 102 which is mounted adjacent to the phase current pathway. In the preferred embodiment, a current sensor sold by the LEM Company is used. The current sensor outputs a voltage which is proportional to current. Current flowing through the phase 1 generates a corresponding signal in the sensor 102. The current sensor 102 prevents excess current loading in the phase 1. Preferably, the current sensing means also includes a comparator (not shown) connected to the current sensor 102. The comparator compares the analog signal (voltage) from the current sensor to a reference voltage. When the sensor signal exceeds the reference signal, a latch signal is inputed to the counter 110, which is explained below.

The circuit 94 also includes a field programmable gate array 104 and a microprocessor 106 connected to the gate array 104. While any appropriate gate array and microprocessor could be used, the circuit 94 uses gate array XC3090-70PC84C manufactured by XILINX, Inc and microprocessor DSP56001RC33 manufactured by Motorola, Inc. The gate array 104 is defined and programmed in a manner consistent with this description and in a manner conventional in the art. Conventional programming hardware recommended by the manufacturer of gate array 104 is also used. Likewise, the microprocessor 106 is programmed in a manner consistent with this description and conventional in the art, with conventional programming hardware recommended by the device manufacturer.

The circuit 94 also includes timing means connected to the current sensing means and to the switch operating means for determining the amount of time for the current in each phase to reach a predetermined current level threshold. More particularly, the field programmable gate array 104 includes timing means in the form of a bank of counters 110. The counters 110 are connected to the current sensor 102 via the comparator (not shown). The counters 110 receive the digital output from the comparator (not shown) and measure the amount of time required for the current in the phase winding to reach a predetermined current threshold level, i.e., the seek current rise time. The counters 110 are set to zero when the seek current pulse is started.

The microprocessor 106 includes comparing means connected to the counters 110. The comparing means compares the seek current rise times from the phase windings. The comparing means includes a comparator 114 connected to a read-only-memory (ROM) based memory array 118.

The microprocessor 106 also includes run means connected to the comparator 114. The run means includes a run signal generator 122 which generates commutation or run control signals to energize a selected phase 1, 2, or 3.

The microprocessor 106 also includes pulse means connected to the counters 110 and to the switch operating means for periodically selectively operating the switch operating means for a limited time to energize the unenergized phases with a seek current without substantially generating torque on the rotor. The pulse means is a pulse signal generator 126 which generates seek pulse control signals. In the preferred embodiment, the seek pulses are of ½ millisecond duration, and occur every millisecond. The seek pulse current is limited to about 3 percent of the motor rated current, and the rise time reference is about 2 percent of the motor's rated current. The seek pulses are kept low in order to limit motor braking torque, and the current limit is set above the reference level to insure the current reaches the reference level.

The microprocessor 106 also includes switch operating means connected to counters 110, pulse signal generator 126, run signal generator 122 and phase switches 98. The switch operating means is a switch controller 130. The switch controller 130 receives as inputs the pulse control signals and commutation control signals from the pulse signal generator 126 and run signal generator 122, respectively, and activates the phase switch 98 in response thereto to generate either a seek current pulse or a commutation current in the phase winding 1.

As the rotor 14 begins to turn and continues to rotate at low speeds, the pulse signal generator 126 of the control circuit 94 sends out low power seek current pulses to the two phases that are not energized with the high power run current. That is, while run signal generator 122 instructs the switch controller 130 to energize one phase (e.g. phase 3) with the run current, the pulse signal generator 126 instructs the switch control to operate the phase switches 98 of the unenergized phase windings (phases 1 and 2) to provide low power seek current pulses (shown in FIG. 3) to the unenergized phase windings (phases 1 and 2).

The current sensor 102 (FIG. 2) monitors the current in the unenergized phase windings and the counters 110 determine the seek current rise times of the seek current in the phase windings. The rise times are transmitted to the comparator 114 of the microprocessor 106. Assuming, for example, that phase 3 is the phase energized with the run current, and that the rotor 14 is moving in a clockwise direction as shown in FIG. 1, rotor poles 26 and 34 are moving toward phase 3 stator poles 54 and 66. This is because of the attractive magnetic force generated by the run current flowing through the phase windings 78 and 90 of phase 3.

Referring to FIGS. 1 and 3, when phase 3 is energized with run current, rotor poles 26 and 34 are quickly moving toward alignment with phase 3 stator poles 54 and 66. The inductance of phase 3 is increasing to its peak value. The inductance of phase 2 is increasing from its lowest point and the rise time of the seek current in phase 2 is increasing. This is because the rotor poles 22 and 30 are moving closer to the phase 2 stator poles 50 and 62, respectively. Conversely, the rotor poles 22 and 30 are moving out of alignment with phase 1 stator poles 46 and 58, respectively. Therefore, the inductance of phase 1 is decreasing and the the rise time of the seek current in phase 1 is decreasing. At alignment of rotor poles 26 and 34 with stator poles 54 and 66, the inductances, and therefore the seek current rise times of phases 1 and 2 are equal.

The comparator 114 compares the rise times of the seek current pulses in the unenergized phases (1 and 2) and outputs a signal to the run signal generator 122 indicating when the seek current rise times of phases 1 and 2 are equal. In response, the run signal generator 122 sends a signal to the switch controller 130 which opens the switch 98 between the power supply voltage and the phase winding 3 (the phase winding energized with the run current) and closes the switch 98 between the power supply voltage and the phase winding 2 (the phase winding having the increasing seek current rise time). This mode of operation will result in effective conmutation of a 98 turn, 6/4 SR motor at operating speeds as high as 10 percent of base speed. After commutation, as illustrated in FIG. 3, the seek pulses are held off for a time (3 milliseconds) so current in the previously energized phase can dissipate.

In another embodiment, the run signal generator 122 includes means for monitoring the time between commutation of the phase windings for computing the rotational speed of the rotor 14. An offset is computed which is porportional to the speed, and is then added to the increasing seek current rise time signal by the comparator 114 so as to effect a change in the seek current rise time to thereby energize the next phase at an earlier rotor angle. This technique increases the operating speed of, for example, a 98 turn, 6/4 SR motor from 10 percent to approximately 20 percent of the motor's base speed.

Other features and advantages of the invention are set forth in the following claims.

I claim:

1. A switched reluctance motor providing rotor position detection without a rotor shaft position sensor, said motor comprising:

a rotor mounted for rotation about a rotor shaft axis and including a central hub having a plurality of circumferentially spaced rotor poles extending radially outwardly from said hub;

a stator surrounding said rotor and having at least three circumferentially spaced stator poles and at least three electrically isolated coils wound around said respective stator poles to form three electrically independent stator phases;

an electrical energy source, and energizing means for selectively energizing said phases in succession with a run current to generate a torque on said rotor and thereby rotate said rotor such that when one of said stator phases is energized to cause rotation of said rotor at a given moment, the other of said stator phases are not energized with said run current at said given moment, said energizing means including:

a plurality of phase switches connected between said phases and said energy source for selectively electrically connecting said energy source to said phases, switch operating means connected to said switches for selectively operating said switches, current sensing means for sensing the amount of current in each of said phases, timing means connected to said current sensing means and to said switch operating means for determining the amount of time for the current in each phase to reach a predetermined current level threshold;

pulse means connected to said switch operating means and to said timing means for periodically selectively operating said switch operating means for a limited time to energize said unenergized phases with a seek current without substantially generating torque on said rotor;

comparing means connected to said timing means for comparing the amount of time that current in each of said unenergized phases took to reach said predetermined current level threshold; and run means connected to said comparing means and said switch operating means for switching on a selected one of said switches to rotate said rotor.

2. A motor in accordance with claim 1 wherein said run means tells said switch operating means to switch on a selected one of said stator phases when said comparing means indicates that said seek current rise times in each of said unenergized phases are approximately equal.

3. A motor in accordance with claim 2 wherein said timing means calculates the apparent rotational speed of said rotor and increases, by an amount based on the rotational speed of said rotor, the indicated seek current rise time of said unenergized phase having the increasing seek current rise time, so as to advance the commutation of said motor with increasing rotor speed.

4. A switched reluctance motor as set forth in claim 1 wherein said energizing means comprises a microprocessor and a field programmable gate array connected to said microprocessor.

5. A switched reluctance motor as set forth in claim 1 wherein said pulse means is a pulse signal generator.

6. A switched reluctance motor as set forth in claim 1 wherein said timing means includes at least one counter connected to said current sensing means.

7. A switched reluctance motor as set forth in claim 1 wherein said run means includes a run signal generator connected to said comparator.

8. A switched reluctance motor providing rotor position detection without a rotor shaft position sensor, said motor comprising:

a rotor mounted for rotation about a rotor shaft axis and including a central hub having a plurality of circumferentially spaced rotor poles extending radially outwardly from said hub;

a stator surrounding said rotor and having at least three circumferentially spaced stator poles and at least three electrically isolated coils wound around said respective stator poles to form three electrically independent stator phases;

an electrical energy source, and energizing means for selectively energizing said phases in succession with a run current to generate a torque on said rotor and thereby rotate said rotor such that when one of said stator phases is energized to cause rotation of said rotor at a given moment, the other of said stator phases are not energized with said run current at said given moment, said energizing means including:

a plurality of phase switches connected between said phases and said energy source for selectively electrically connecting said energy source to said phases, switch operating means connected to said switches for selectively operating said switches, current sensing means for sensing the amount of current in each of said phases, timing means connected to said current sensing means and to said switch operating means for determining the amount of time for the current in each phase to reach a predetermined current level threshold;

pulse means connected to said switch operating means and to said timing means for periodically selectively operating said switch operating means for a limited time to energize said unenergized phases with a seek current without substantially generating torque on said rotor, said pulse means delaying for a short time after said unenergized phase was energized pulsing said unergized phase with seek current;

comparing means connected to said timing means for comparing the amount of time that current in each of said unenergized phases took to reach said predetermined current level threshold; and run means connected to said comparing means and said switch operating means for switching on a selected one of said switches to rotate said rotor.

9. A motor in accordance with claim 8 wherein said run means tells said switch operating means to switch on a selected one of said stator phases When said comparing means indicates that said seek current rise times in each of said unenergized phases are approximately equal.

10. A motor in accordance with claim 9 wherein said timing means calculates the apparent rotational speed of said rotor and increases, by an amount based on the rotational speed of said rotor, the indicated seek current rise time of said unenergized phase having the increasing seek current rise time, so as to advance the commutation of said motor with increasing rotor speed.

11. A switched reluctance motor as set forth in claim 8 wherein said energizing means comprises a microprocessor and a field programmable gate array connected to said microprocessor.

12. A switched reluctance motor as set forth in claim 8 wherein said pulse means is a pulse signal generator.

13. A switched reluctance motor as set forth in claim 8 wherein said timing means includes at least one counter connected to said current sensing means.

14. A switched reluctance motor as set forth in claim 8 wherein said run means includes a run signal generator connected to said comparator.

15. A switched reluctance motor as set forth in claim 8 wherein said pulse means delay is about 3 milliseconds.

* * * * *